United States Patent [19]
Kudo

[11] 3,870,594
[45] Mar. 11, 1975

[54] LAMINATED METAL-BASED FACING

[75] Inventor: Shinji Kudo, Osaka, Japan

[73] Assignee: Yodogawa Steel Works, Limited, Osaka-shi, Japan

[22] Filed: Aug. 11, 1972

[21] Appl. No.: 279,930

[30] Foreign Application Priority Data
Aug. 16, 1971 Japan................................ 46-62219
Mar. 24, 1972 Japan................................ 47-30151

[52] U.S. Cl................. 161/165, 156/313, 161/190, 161/213, 161/214, 161/220, 161/231, 161/232, 161/257, 161/262, 161/270

[51] Int. Cl..... B32b 5/00, B32b 15/14, B32b 21/08

[58] Field of Search......... 161/220, 213, 6, 92, 165, 161/232, 214, 151, 190, 231, 257, 262, 270; 156/313

[56] References Cited
UNITED STATES PATENTS

| | | | |
|---|---|---|---|
| 2,003,752 | 6/1935 | Landt.................................. | 161/220 |
| 2,456,006 | 12/1948 | Hickler............................... | 156/313 |
| 2,699,417 | 1/1955 | Repsher.............................. | 161/220 |
| 2,987,431 | 6/1961 | Büchler............................... | 161/6 X |
| 3,217,403 | 11/1965 | Pekar................................... | 161/213 |
| 3,240,660 | 3/1966 | Atwell.................................. | 161/92 |
| 3,391,056 | 7/1968 | Robinson............................. | 161/232 |
| 3,425,989 | 2/1969 | Shepard.............................. | 161/262 |
| 3,503,831 | 3/1970 | Oyama................................. | 161/220 |
| 3,522,138 | 7/1970 | Lee...................................... | 161/92 |

Primary Examiner—George F. Lesmes
Assistant Examiner—Ellis P. Robinson

[57] ABSTRACT

This invention relates to a laminated metal-based facing constructed in the manner that a metal sheet as a construction member and a facing veneer of natural wood as a facing member are formed by heating under pressure into one body with nonwoven cloth of non-binder construction placed therebetween as a medium for an adhesive layer to thereby bond said metal sheet with said facing veneer firmly and to make the sheets thus laminated adapted for bending work, said cloth being impregnated with a thermoplastic resin modified phenol resin adhesive or elastomer modified phenol resin adhesive.

8 Claims, 3 Drawing Figures

3,870,594

LAMINATED METAL-BASED FACING

This invention relates to a laminated metal-based facing or a laminated metal-based decorative sheet or plate integrated by laying a facing veneer of natural fancy wood over a metal sheet or plate, and more particularly to a laminated metal-based facing which is made up in firm combination of a metal sheet as a construction member and of a facing veneer as facing member of figured grain of wood and which is used principally as a building member.

Various attempts have been made to give a variety of decorative effects to the surface of a metal sheet in an effort to use a metal sheet such as a galvanized iron sheet, aluminum sheet, stainless steel sheet, etc. as an interior finish material of building such as, for example a ceiling member, wall member, door member. For instance, when a melamine resin layer is printed on a metal sheet and figured grain of wood is printed on the resin layer thus formed, such a sheet is known as a printed steel sheet. Although this type of metal sheet is excellent in heat-resisting, abrasion-resisting and adhesive properties because of the thermosetting resin layer formed on the metal surface, it lacks bendability and is limited also in the scope of use to a planar area, and also lacks a feeling of naturally figured grain of wood because of the decorative pattern shown by printing. On the other hand, there is available a metal-based facing (known as a polyvinyl chloride film coated steel sheet) produced by adhesively coating a metal sheet with a thermoplastic resin film, especially a polyvinyl chloride film on which a desired pattern is printed, and although such a facing can have a bending property, it lacks naturally figured grain of wood as in the preceding case because of printed pattern and is inferior in heat-resisting, abrasion-resisting, stain-resisting and adhesive properties.

Indeed, there has not always been any attempt to overlay a metal sheet with a facing veneer of natural fancy wood. To show an instance of such a sheet, it was suggested to substitute the moisture and air in a veneer by a thermoplastic resin solution and to lay a transparent thermoplastic resin film over one side of the veneer in which said resin solution was set, lay the same film over the other side of the veneer, and further lay a metal sheet over the film and adhere the sheet thereto and heat the sheets thus laminated under pressure to thereby produce an integrally combined facing.

But such a facing was a combination of a metal sheet and a veneer adhered to each other by use of a mere thermoplastic resin film, and was exfoliated when it was bent for working, because it was not strong in adhesion and in addition it lacked a heat-resisting property.

In view of such disadvantages, the present inventor attempted a method by which to apply an adhesive to a metal sheet such as an iron sheet, aluminum sheet, place a facing veneer on the metal sheet and to integrally combine them by heating under pressure. But such a method made it difficult to select an adhesive, and when an adhesive normally capable of adhering to a metal sheet, such as rubber-based or epoxy-based adhesive was applied, it was found that many cracks were formed in the facing veneer in the portion where the veneer was subjected to bending work because a rubber-based adhesive applied product was inferior or in property of matter, especially in resistance to chemicals and heat, and an epoxy-based adhesive applied product was superior in resistance to chemicals and heat but inferior in bending work, because there was difference in elongation percentage between the facing veneer and the metal sheet and because there was no buffer effect in the layer of the adhesive.

In an effort to eradicate the disadvantages of the kind described above, the present inventor has made further researches and found that he could obtain a laminated metal-based facing excellent in workability by using a sheet of nonwoven cloth of synthetic resin of nonbinder construction in the adhesion between a facing veneer and a metal sheet, said sheet being impregnated with a thermoplastic resin modified or elastomer modified phenol resin adhesive which has flexibility and an ability to adhere to a metal sheet.

Accordingly, a primary object of this invention is to provide a laminated metal-based facing in which a metal sheet as a construction member and a facing member of figured grain of natural wood are integrated into a laminated sheet with strong adhesibility held.

Another object of the invention is to provide a laminated metal-based facing having the same forming workability as a galvanized iron sheet and a polyvinyl chloride film coated steel sheet.

Yet another object of the invention is to provide a laminated metal-based facing having not only excellent strength, noncombustibility, fire resistance, but also elegance inherent in natural wood.

These and other objects and advantages of this invention will become apparent from the following description, taken in conjunction with the drawings, of preferred embodiments of the invention shown by way of example.

Figure 1:
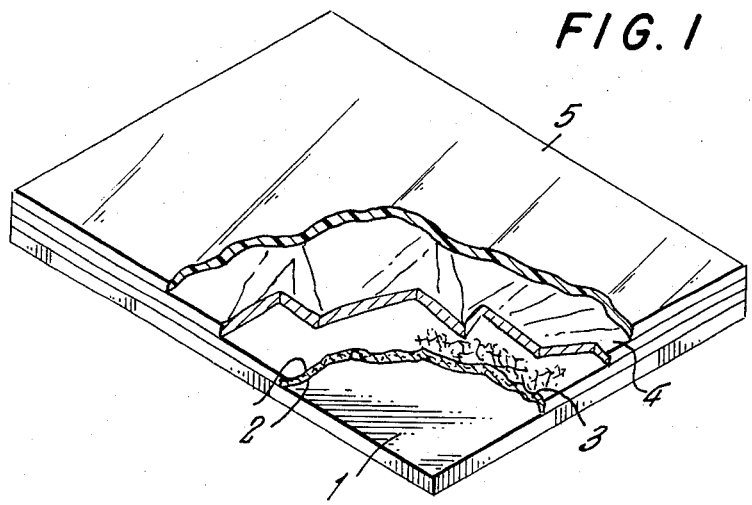
FIG. 1 is a perspective view, broken in part, of a preferred embodiment of the laminated metal-based facing according to this invention.
Figure 2:
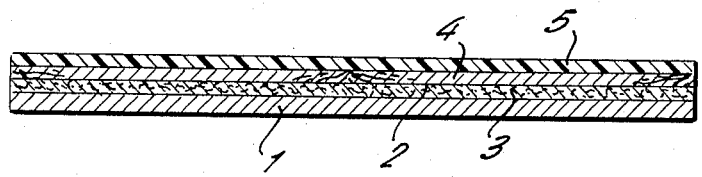
FIG. 2 is an enlarged longitudinal sectional front elevation, in part, of FIG. 1.

As apparent from FIG. 1 of the drawings, the laminated metal-based facing of the invention includes a metal sheet 1, nonwoven cloth 3 of nonbinder construction containing an adhesive 2 and laid over at least one side of the metal sheet 1, and a facing veneer 4 of natural wood laid over the upper side of the nonwoven cloth 3, and these laminated materials are heated under pressure to form an integral facing material. In the embodiment shown in FIGS. 1 and 2, the facing veneer 3 is further coated on the surface with a synthetic resin film 5, and another embodiment shown in FIG. 3 in which this film 5 is omitted shows that the facing of the invention can be bent into an L-shape, U-shape and arcuate shape in longitudinal section. Now, a detailed description will be made in due order of each member used in the above construction.

The metal sheet 1 used in the invention is a thin metal sheet such as of a galvanized iron sheet, steel sheet, aluminum sheet, etc. and the proper thickness of the metal sheet may depend upon the kind of working that will subsequently be carried out on the metal sheet. Before other sheets are laid on the surface of the metal sheet 1, the metal sheet is cleaned by degreasing, deacidification, etc. that are normally carried out. Further, in order to improve adhesibility in the galvanized iron sheet or aluminum sheet, they may be coated with a phosphoric acid film. As an adhesive 2 may be used a thermoplastic resin modified phenol resin adhesive or an elastomer modified phenol resin adhesive. This is because the adhesive is excellent in adhesibility between the metal sheet 1 and the facing veneer 4 and also in resistance to heat and chemicals and because bendability is imparted to the layer of adhesive by the flexibility provided by the thermoplastic resin or elastomer. But as will become apparent from the Table that will be later shown, the intended bendability of the invention cannot be obtained by mere application of the above adhesive 2 to the metal sheet 1, but the adhesive 2 must be retained by the nonwoven cloth 3 of nonbinder construction as will be described below.

As the phenol resin adhesive of the type specified above may be mentioned a phenol butyral copolymer adhesive, phenol nitrile rubber adhesive or such a one in which, to improve adhesibility to metal, an epoxy group is further added to those modified phenol resin adhesives, and in this case more preferably the content of phenol resin group in the adhesive is less than 60 mol %. Namely, the reason is that, if the phenol resin group exceeds 60 mol %, slight deterioration in flexibility results and that, unless the temperature at which the laminated members are heated is raised, there is developed a tendency of the adhesive not to set sufficiently and that this, in turn, reduces the bendability of the facing veneer and causes damage due to heating. The nonwoven cloth 3 of nonbinder construction is an important adhesive medium in the invention by which to flexibly adhere the facing veneer 4 and the metal sheet 1 by use of the above adhesive 2, and when the fibers of the nonwoven cloth are connected to each other through binder construction, coating or impregnation of the nonwoven cloth 3 with the adhesive 2 is prevented by the binder and sufficient containing of adhesive becomes impossible, and thus an adhesive effect after lamination is reduced (See Example 2 to be shown later). The nonwoven cloth, as well known, has originally no particular directivity to outer force such as bending, tension, compression as compared with woven cloth, and consequently it is superior in workability. As the nonwoven cloth 3 of the invention is desirable such nonwoven cloth which has a heat-resisting property free from reduction in strength of fiber due to heating and which is not great in difference in longitudinal and transverse elongation percentage in the state of nonwoven cloth. To this end, the use of one or more of polyester fibers, polyamide fibers and acrylonitrile fibers is preferred.

It is readily understandable that the easiness of adhering work with which it is possible to adhere the facing veneer 4 to the metal sheet 1 by mere inclusion of the nonwoven cloth 3 between the facing veneer 4 and the metal sheet 1 and the advantage in the process of manufacture that enables storing of the nonwoven cloth itself are obtained by coating or impregnating the nonwoven cloth 3 with the adhesive 2 beforehand. A combination of the nonwoven cloth of nonbinder construction and of the adhesive as stated above provides such excellent bendable workability also in the adhered portions as will later be described. By the facing veneer 4 obtained from natural wood is meant a film produced by cutting to a thickness of about 0.1 - 0.9 mm a flitch of a specified length, width and thickness cut away from a log such as a pine, cedar, Japanese cypress, teak, American black walnut, etc., and it is evidently a natural wood film itself having the figured grain pattern of a log revealed on the cut surface. If there is much moisture left in the facing veneer 4 thus produced, namely if the veneer 4 has not been sufficiently dried, vaporized moisture produces adverse effects on adhering in time of forming under pressure and constitutes causes of creases and slackening, and accordingly it is desirable to make the moisture content of the veneer 4 as small as possible, and the moisture content is normally less than 10% by weight. However, if the veneer 4 is extremely small in moisture content, it becomes fragile and adhesion of the veneer 4 to the nonwoven cloth 3 becomes difficult, and hence moisture content in the range of normally 4 - 10% by weight is desirable. Also, the thickness of the facing veneer 4 varies with the quality of wood and the degree of finishing to be subsequently carried out, but preferably a thickness of less than 0.3 mm is safe to process.

The metal sheet 1, nonwoven cloth 3 containing the adhesive 2 and the facing veneer 4 of the type described above are laid one over another successively from the lower layer to the upper, and the materials thus laminated are formed into one body by heating under pressure to thereby obtain the laminated metal-based facing of the invention. Incidentally, it is optional with manufacturers to apply a film 5 of synthetic resin paint to the facing veneer 4 of the uppermost layer in order to provide for water-proofness and to prevent surface scratches and stains. And in forming this coating film, care must be exercised to select the kind of paint to be used by considering not only coating for the above purposes but workability that may subsequently be required. Namely, such a type of paint having a suitable amount of flexibility as will produce no crack in the bent portions even if the finished sheet is subjected to bending work after the application of the paint. To this end, aminoalkyl resin paint and polyurethane paint are advantageously used. And more preferably in this case care must be used to make the amount of paint applied as small as possible within the allowable limits of the purpose of coating and to prevent workability from being obstructed by an unnecessarily large amount of coating film. When the paint of the above kind was used, it was experimentally found desirable to make the amount of solid coated less than 200 g/m$^2$. Of course, the restrictions of the character described with respect to the coating film is removed so long as the laminated metal-based facing of the invention is not subjected to any kind of working after the facing has been integrated into a finished laminated sheet, for example when it is used exclusively as a plane sheet. And when the facing of the invention is used under the circumstances where no forming of coating film 5 is required, exposed use of the facing veneer 4 is also possible.

Figure 3:
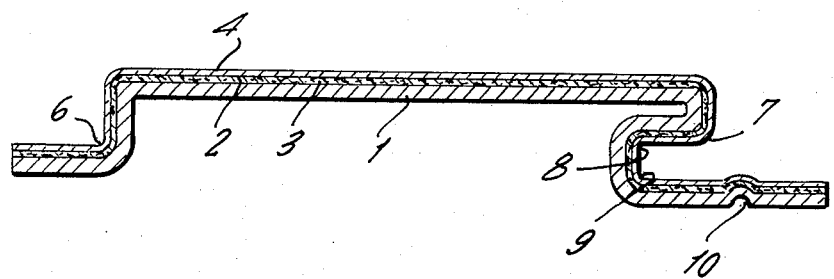
FIG. 3 is a longitudinal sectional front elevation of another embodiment of the laminated metal-based facing according to the invention.

When the laminated sheet materials of the kind described are clamped between an upper and lower pair of hot presses that are normally used to lay them one over another and to form them into one body by heating under pressure and when they are heated at a temperature in the range of 100 - 160°C under pressure in the range of 8 - 20 Kg/cm$^2$, the laminated metal-based facing of the invention is obtained. Also, such a method may be employed in which the laminated sheet materials for the facing of the invention are placed in several sets in one stage of the hot press, heated under pressure under the described conditions and thereafter cooled with the pressure maintained. Since the described type of hot press has nothing to do with changes in the essential property of the invention, a description of the type of hot press is omitted. The facing of the invention thus obtained is capable of being bent into an L-shape, U-shape or arcuate shape (bar-shaped) as shown in FIG. 3, and there is no crack or separation shown produced through the bending between layers in the bent portions 6, 7, 8, 9 and 10 in the figure. It will be understood that the facing of the invention can thus be used as various building members of any cross section, for example, a column of square closed section and a lintel of irregular section.

Now, a description will be made of a method of manufacture of the laminated metal-based facing of the invention and the performance of the facing with reference to examples.

EXAMPLE 1

Nonwoven cloth of nonbinder construction made of polyethylene phthalate fiber with a weight of 30 g/m$^2$ was impregnated with an adhesive 2 prepared by copolymerizing 55 mol % phenol and 45 mol % butyral to produce nonwoven cloth 3 impregnated with the adhesive 2 containing 3% nonvolatile matter and the amount of resin impregnable 40 g/m$^2$. Next, a facing veneer 4 having a thickness of 0.25 mm and containing 6% moisture was laid over the nonwoven cloth 3 thus produced and was spot adhered by an iron to the nonwoven cloth 3. Thereafter, the nonwoven cloth 3 and the facing veneer 4 thus spot adhered were laid over a phosphoric acid treated galvanized iron sheet 1 of a thickness of 0.4 mm, and the whole of the three was inserted through the hot press, heated under pressure of 10 kg/cm$^2$ at a temperature of 130°C for 15 minutes. The surface of the facing veneer 4 of the laminated metal-based facing was polished and then two-liquid setting type polyurethane resin was applied to the surface of the facing veneer 4 in such a manner that the amount of solid applied may reach 60 g/m$^2$, and printed at about 60°C for 20 minutes to form a coated film 5.

The following table shows comparison of characteristic features between two metal-based facings, one being the metal-based facing of this invention produced by the method described above, and the other being the metal-based facing produced for comparison's sake by applying the adhesive of the invention directly to the galvanized iron sheet, as aforestated, in such a manner that the amount of solid applied may reach 150 g/m$^2$, laying a facing veneer over the galvanized iron sheet, heating the facing veneer and the galvanized iron sheet together under pressure under the same conditions as above, and thereafter applying polyurethane paint to the thus integrated sheet under the same conditions.

Table

| Particulars | Invention | Comparison |
| --- | --- | --- |
| Adhesive force (tensile shearing) | 40 kg/cm$^2$ | 45 kg/cm$^2$ |
| JAS cooling and heating repetition test A test | Passed | Cracks produced |
| JAS Class 1 immersion separation test | Passed | Passed |
| JAS stain resistance A test | Passed | Passed |
| Bending test based on JIS K 5400 | No crack produced | Many cracks produced |
| Weather resistance (Weather-Ometer 500 h) | No damage | Greatly affected |

Table-Continued

| Particulars | Invention | Comparison |
| --- | --- | --- |
| Workability | Good | by adhesive (color changed) Difficult to adhere |
| Surface state | Good | Many spots of adhesive produced |

As shown, it is demonstrated that the laminated metal-based facing provided by the invention is excellent in surface performance and also in workability.

EXAMPLE 2

Nonwoven cloth of nonbinder construction made of nylon 66 with a weight of 40 g/m$^2$ was impregnated with an adhesive prepared by copolymerizing 50 mol % phenol and 50 mol % nitrile rubber to produce nonwoven cloth impregnated with an adhesive 2 containing the amount of resin impregnable 45 g/m$^2$ and 4% nonvolatile matter. A facing veneer with a thickness of 0.2 mm and an 8% moisture content was spot adhered by an iron to the nonwoven cloth thus treated to form a temporarily laminated sheet, and then this temporarily laminated sheet was laid over an aluminum sheet 1 of a thickness of 1 mm and the whole of the three layers of materials adhered was inserted through the hot press and heated at a temperature of 110°C under pressure of 10 kg/cm$^2$ for 10 minutes.

For comparison's sake, nonwoven cloth of rayon fiber and acryl binder construction was treated under the same conditions as above to obtain an aluminum-based facing for use in a comparison test. Two kinds of aluminum facings thus obtained were passed through a roller forming machine for spandrel to thereby form a spandrel of an effective work width of 150 mm as shown in FIG. 3. The radius of bend of the bent portions of the spandrel was 2 mm R. In the case of this invention there is no crack produced at all in the L-shaped bent portion 6, U-shaped bent portions 7, 8, 9 and arcuately bent portion 10 of the spandrel in FIG. 3. In contrast thereto, the aluminum-based facing for comparison test produced many cracks.

As will be understood from the description made as above of the invention with reference to two preferred embodiments of the invention, the laminated metal-based facing provided by the invention makes it possible to reduce the production of cracks in the facing veneer to as good as nothing by absorbing the difference in elongation between the facing veneer and the metal sheet in bending work because the nonwoven cloth of synthetic resin fiber of nonbinder construction impregnated or coated with a thermoplastic resin modified or elastomer modified phenol resin adhesive was used in the adhesion between the facing veneer and the metal sheet in the invention. Moreover, the facing of the invention makes it possible to stick the facing veneer to the metal sheet in an easy manner, and because the nonwoven cloth itself enables storing independently, the facing of the invention facilitate control in conjunction with the step of manufacture. Furthermore, because a phenol-based adhesive is used in the invention, heat resistance and flexibility is excellent and adhesibility with respect to both the metal sheet and the facing veneer is also sufficient. Also, when the facing veneer is coated with a film of paint in the invention and if the film is flexible, the the same bend forming is possible as when there is provided no film coating. Accordingly, the facing of the invention offers the great advantage with which the facing of the invention makes forming work possible notwithstanding the fact that it is a coated product. In addition, because the facing of the invention is a metal sheet in base, it is excellent not only in characteristic property as a reinforcing member, but also in noncombustible and fire-proof properties. On the other hand, because the facing veneer used in the invention possesses the elegance inherent in natural wood, the facing of the invention not only can find application as a building member which is strong, beautiful and high in plasticity, but also can find wide application in the same way as a cabinet material, decorative material and other conventional colored galvanized iron sheet, polyvinyl chloride film coated steel sheet and the like are used, and its industrial applicability should be highly valued.

Various changes and modifications may be made in practicing the invention without departing from the scope and spirit thereof and, therefore the invention is not to be limited except as defined in the appended claims.

What I claim is:

1. A laminated metal-based facing capable of being bent without cracking or separating due to the bending and useful as an interior finishing or building material, said facing having as base a metal sheet, a resin adhesive layer on the metal sheet and a veneer of natural wood over the resin adhesive layer, said metal sheet, resin adhesive layer and natural wood veneer being laminated together under heat and pressure, and said resin adhesive layer being nonwoven cloth of non-binder construction obtained from synthetic resin fiber and impregnated with a thermoplastic phenolic resin adhesive having less than 60 mol % of phenol resin groups which is flexible and adheres to the metal sheet.

2. A laminated metal-based facing capable of being bent without cracking or separating due to the bending and useful as an interior finishing or building material, said facing having as base a metal sheet, a resin adhesive layer on the metal sheet and a veneer of natural wood over the resin adhesive layer, said metal sheet, resin adhesive layer and natural wood veneer being laminated together under heat and pressure, and said resin adhesive layer being nonwoven cloth of non-binder construction obtained from synthetic resin fiber and impregnated with a thermoplastic phenolic resin adhesive having less than 60 mol % of phenol resin groups which is flexible and adheres to the metal sheet, the lamination taking place at 100–160°C and 8–20 kg/cm$^2$.

3. A laminated metal-based facing capable of being bent without cracking or separating due to the bending and useful as an interior finishing or building material, said facing having as base a metal sheet, a resin adhesive layer on the metal sheet and a veneer of natural wood over the resin adhesive layer, said metal sheet, resin adhesive layer and natural wood veneer being laminated together under heat and pressure, and said resin adhesive layer being nonwoven cloth of non-binder construction obtained from synthetic resin fiber and impregnated with a thermoplastic phenolic resin adhesive having less than 60 mol % of phenol resin groups which is flexible and adheres to the metal sheet, said metal sheet having a thickness of 0.4–1.0 mm.

4. A laminated metal-based facing capable of being bent without cracking or separating due to the bending and useful as an interior finishing or building material, said facing having as base a metal sheet, a resin adhesive layer on the metal sheet and a veneer of natural wood over the resin adhesive layer, said metal sheet, resin adhesive layer and natural wood veneer being laminated together under heat and pressure, and said resin adhesive layer being nonwoven cloth of non-binder construction obtained from synthetic resin fiber and impregnated with a thermoplastic phenolic resin adhesive having less than 60 mol % of phenol resin groups which is flexible and adheres to the metal sheet, said metal sheet having a thickness of 0.4–1.0 mm and being composed of galvanized iron, aluminum or stainless steel.

5. A laminated metal-based facing capable of being bent without cracking or separating due to the bending and useful as an interior finishing or building material, said facing having as base a metal sheet, a resin adhesive layer on the metal sheet and a veneer of natural wood over the resin adhesive layer, said metal sheet, resin adhesive layer and natural wood veneer being laminated together under heat and pressure, and said resin adhesive layer being nonwoven cloth of non-binder construction obtained from synthetic resin fiber and impregnated with a thermoplastic phenolic resin adhesive having less than 60 mol % of phenol resin groups which is flexible and adheres to the metal sheet and said natural wood veneer having a moisture content between 4% and 10% by weight.

6. A laminated metal-based facing capable of being bent without cracking or separating due to the bending and useful as an interior finishing or building material, said facing having as base a metal sheet, a resin adhesive layer on the metal sheet and a veneer of natural wood over the resin adhesive layer, said metal sheet, resin adhesive layer and natural wood veneer being laminated together under heat and pressure, and said resin adhesive layer being nonwoven cloth of non-binder construction obtained from synthetic resin fiber and impregnated with a thermoplastic phenolic resin adhesive having less than 60 mol % of phenol resin groups which is flexible and adheres to the metal sheet and said natural wood veneer having a moisture content between 4% and 10% by weight and a thickness less than 0.3 mm.

7. A laminated metal-based facing capable of being bent without cracking or separating due to the bending and useful as an interior finishing or building material, said facing having as base a metal sheet, a resin adhesive layer on the metal sheet and a veneer of natural wood over the resin adhesive layer, said metal sheet, resin adhesive layer and natural wood veneer being laminated together under heat and pressure, and said resin adhesive layer being nonwoven cloth of non-binder construction obtained from synthetic resin fiber and impregnated with a thermoplastic phenolic resin adhesive having less than 60 mol % of phenol resin groups which is flexible and adheres to the metal sheet and a flexible film of synthetic resin paint on said veneer.

8. A laminated metal-based facing capable of being bent without cracking or separating due to the bending and useful as an interior finishing or building material, said facing having as base a metal sheet, a resin adhesive layer on the metal sheet and a veneer of natural wood over the resin adhesive layer, said metal sheet, resin adhesive layer and natural wood veneer being laminated together under heat and pressure, and said resin adhesive layer being nonwoven cloth of non-binder construction obtained from synthetic resin fiber and impregnated with a thermoplastic phenolic resin adhesive having less than 60 mol % of phenol resin groups which is flexible and adheres to the metal sheet and a flexible film of synthetic resin paint on said veneer less than 200 g/m$^2$ in amount.

* * * * *